2,945,040
Patented July 12, 1960

1

2,945,040
CERTAIN ISONICOTINIC ACID-N-OXIDE POLY-HALOGEN DIPHENYL ALKYL AMIDES
Heinrich Leditschke, Frankfurt am Main, Heinrich Rolly, Kelkheim (Taunus), and Heinz Schmidt-Ruppin, Bad Soden (Taunus), Germany, assignors to Farbwerke Hoechst Aktiengesellschaft vormals Meister Lucius & Bruning, Frankfurt am Main, Germany, a corporation of Germany
No Drawing. Filed Dec. 2, 1958, Ser. No. 777,575
Claims priority, application Germany Dec. 6, 1957
3 Claims. (Cl. 260—295)

The present invention relates to isonicotinic acid-N-oxide-amides of the general formula

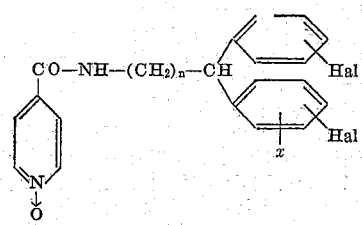

in which Hal represents halogen, $n$ represents the integer 1 or 2, and $x$ stands for hydrogen, halogen or the methyl group which are distinguished by an excellent efficiency on influenza infections. The invention further provides a process for preparing these compounds by reacting isonicotinic acid-N-oxide or its reactive derivatives with substituted alkyl-amines of the formula

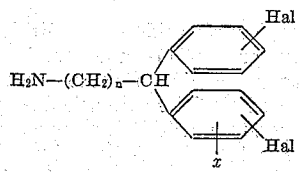

in which Hal, $n$ and $x$ have the meanings given above or by oxidizing isonicotinic acid amides of the formula

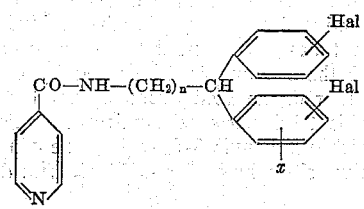

in which $n$, $x$ and Hal have the meanings given above, with organic per-acids.

As starting substances for the process according to the invention there enter into consideration on the one hand the isonicotinic acid-N-oxide or its reactive derivatives and amines of the formula

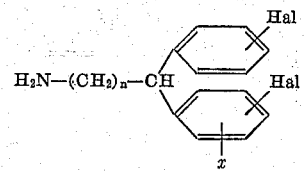

and, on the other hand the compounds of the general formula

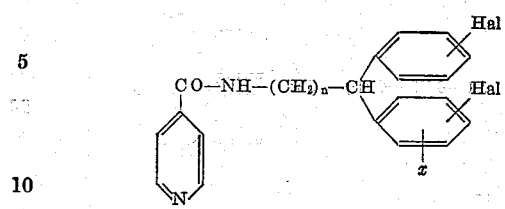

obtainable by reaction of isonicotinic acid with substituted alkyl-amines.

As reactive derivatives of the isonicotinic acid-N-oxide there may be mentioned, for example, the halides, esters, azides and the hydrohalic acid salts. The corresponding acid chloride can favorably be used.

As amines of the above-mentioned general formula there are mentioned:

3,3-(p,p'-dichlorodiphenyl)-propylamine,
3-(p-fluorophenyl)-3-(p-chlorophenyl)-propylamine,
3-(o-chlorophenyl)-3-(p-chlorophenyl)-propylamine,
3-(m-chlorophenyl)-3-(p-chlorophenyl)-propylamine,
3-(m-methyl-p-chlorophenyl) - 3 - (p-chlorophenyl)-propylamine,
3-(2',4'-dichlorophenyl)-3-(p-chlorophenyl)-propylamine.

The above-mentioned isonicotinic acid amides can be prepared, for instance, by reaction of isonicotinic acids or their reactive derivatives, for example with the above-mentioned amines, it being possible to react the free isonictonic acids with the amines by short heating to an elevated temperature or by using the reactive derivatives, for example the halides, esters, azides or the hydrohalic acid salts of isonicotinic acids, starting the reaction at room temperature and terminating it at an elevated temperature.

According to one method of operation of the process the oxidation of the isonicotinic acid amide with organic per acids is suitably carried out a temperature between about 60° C. and about 80° C. As organic per acids there enter into consideration in addition to peracetic acid for instance perbenzoic acid or monoperphthalic acid. When peracetic acid is used it is favorable to apply as solvent glacial acetic acid which simultaneously serves for the preparation of peracetic acid. When using, however, other per acids, for instance perbenzoic acid, it is of advantage to carry out the reaction in an inert solvent which does not react with the starting substances, benzene being particularly appropriate for this purpose.

When using as starting substances instead of the free isonicotinic acid-N-oxides their derivatives it is advantageous to vary the conditions of reaction accordingly. In the latter case it may be favorable to add an inert solvent, such as benzene, toluene, xylene, acetone or ether and to use organic bases, such as pyridine, quinoline or trimethylamine. An excess of the amine used as reactant can, however, likewise be used as acid binding agent. The reaction is favorably effected at room temperature or at a moderately decreased temperature, preferably between —5° C. and +20° C.; cooling with ice is favorably applied. The reaction can be terminated by subsequent heating on the steam bath.

The above-mentioned method of operation is favorably applied when starting from isonicotinic acid-N-oxide-halides, preferably from isonicotinic acid-N-oxide chlorides. The use of free isonicotinic acid-N-oxides or of their esters implies higher temperatures. In these cases the components are favorably heated for a short time to a temperature between 160° C. and about 230° C. It is not necessary to add an inert organic solvent, but xylene or toluene, for instance, may be used.

When being subcutaneously administered, the compounds of the formula

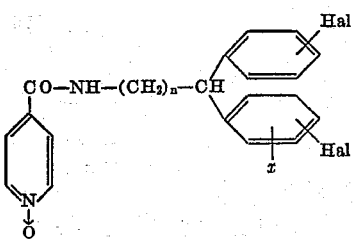

in which Hal, n and x have the meanings given above obtained by the process of the invention are characterized by an extraordinarily good efficiency on influenza infections. For example, the isonicotinic acid-N-oxide [3,3-(p,p'-dichlorophenyl)-propyl-(1)]-amide upon oral administration of 4 times 0.625 mg./20 grams provokes an average delay of influenza APR8 of 27.3% in mice. When the substance is subcutaneously applied the delay of influenza APR8 amounts to an average of 42.5% with 4 doses of 2.5 mg./20 grams each. The products of the invention likewise act on dog's distemper.

The compounds can be worked up to pharmaceutical preparations, if necessary in admixture with pharmaceutically usual carrier substances such as starch, lactose, talcum, tragacanth, magnesium-stearate. They, therefore, can be applied for instance in the form of tablets, dragees, capsules, drops, emulsions and ampoules.

The following examples serve to illustrate the invention but they are not intended to limit it thereto, the parts being by weight, unless otherwise stated.

EXAMPLE 1

*Isonicotinic acid-N-oxide [3,3-(p,p'-dichlorodiphenyl)-propyl-(1)]-amide*

24.5 parts of isonicotinic acid-N-oxide-chloride-hydrochloride are introduced, while cooling with ice within 10 minutes into 24 parts of 3,3-(p,p'-dichlorodiphenyl)-propylamine in such a manner that the temperature does not exceed 20° C. The reaction mixture is then heated for 30 minutes on the steam bath and poured into 2000 parts by volume of water. The separated brown oil is decanted several times with 2000 parts by volume of water. After trituration and standing the oil solidifies (30.7 parts) with formation of crystals. The crude product is heated to boiling together with 70 parts by volume of acetone, whereby brown impurities are dissolved. 25.1 parts of isonicotinic acid-N-oxide-[3,3-(p,p'-dichlorodiphenyl)-propyl-(1)]-amide are obtained, melting at 125–126° C. After double recrystallization from acetone, at first with use of charcoal, crystals are obtained melting at 128–129° C. (with decomposition) and which crystallize with half a mol of acetone.

The 3,3-(p,p'-dichlorophenyl)-propylamine is prepared in the following manner:

274 parts of para-chlorocinnamic acid are converted by means of 600 parts of finely pulverized anhydrous alumi-num-chloride and chlorobenzene into 245 parts of β,β-(p,p'-dichloro-diphenyl)-propionic acid, melting at 190–191° C. 267 parts of this compound are transformed with 1340 parts by volume of thionyl-chloride into the acid chloride (335 parts) and the latter compound is reacted with 2000 parts by volume of concentrated ammonia in order to obtain 184 parts of β,β-(p,p'-dichloro-diphenyl)-propionic acid amide which melts at 153–154° C. 222 parts of β,β-(p,p'-dichloro-diphenyl)-propionic acid amide are treated with 222 parts by volume of thionyl chloride and there are obtained 106 parts of β,β-(p,p'-dichloro-diphenyl)-propionitrile melting at 80–81° C. 100 parts of this compound are hydrogenated in order to obtain 85 parts of 3,3-(p,p'-dichloro-diphenyl)-propylamine boiling at 204–206° C. under a pressure of 3 mm. Hg. A colorless oil is obtained.

EXAMPLE 2

*Isonicotinic acid - N - oxide-[3,3-(p,p'-dichloro-diphenyl-propyl)-(1)]-amide*

39.4 parts of isonicotinic acid-3,3-(p,p'-dichloro-diphenyl)-propyl-(1)-amide are heated with 46 parts of hydrogen peroxide of 30% strength and 100 parts by volume of glacial acetic acid in the oil bath at an external temperature of 90° C. at first for 3 hours and then for 8 hours to 110° C. The major part of the solvent is then distilled off under reduced pressure, 200 parts by volume of water are added to the residue and the water is again steamed off under reduced pressure. Two times 200 parts by volume of acetone are added to the residue and the acetone is eliminated each time by steaming. By dissolving the crystalline residue in 1000 parts by volume of acetone, filtering and concentrating the acetone by evaporation in order to obtain 100 parts by volume, there are obtained 28 parts of isonicotinic acid-N-oxile-[3,3-(p,p'-dichloro-diphenyl-propyl)-(1)]-amide in the form of colorless crystals melting at 128–129° C. (with decomposition). The product crystallizes with half a mol of acetone.

EXAMPLE 3

*Isonicotinic acid - N - oxide-[3-(3',4'-dichlorophenyl)-3-(4'-chlorophenyl)-propyl-(1)]-amide*

42 parts of isonicotinic acid-3-(3',4'-dichlorophenyl)-3-(4'-chloro-phenyl)propyl-(1)-amide are heated with 46 parts of hydrogen peroxide of 30% strength and 100 parts by volume of glacial acetic acid in the oil bath at an external temperature of 90° C. at first for 3 hours and then for 8 hours to 110° C. The reaction mixture is then concentrated by evaporation under reduced pressure on the steam bath, 250 parts by volume of water are added to the residue and the water is again removed by evaporation under reduced pressure. To the residue there are added three times 200 parts by volume each time of acetone and the acetone is eliminated by evaporation. The residue, recrystallized from a small amount of acetone yields 23.6 parts of isonicotinic acid-N-oxide-[3-(3',4' - dichlorophenyl)-3-(4'-chlorophenyl) - propyl-(1)]-amide which melts at 116–117° C. with decomposition.

We claim:

1. Isonicotinic acid-N-oxide-amides of the general formula

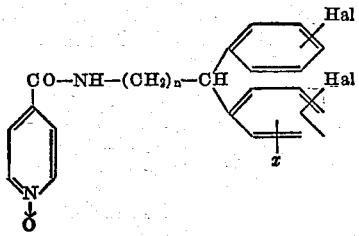

wherein Hal represents a halogen atom having a molecular weight up to 35.5, $n$ is an integer from 1 to 2, and $x$ is a member of the group consisting of hydrogen, halogen and methyl.
2. The compound of the formula
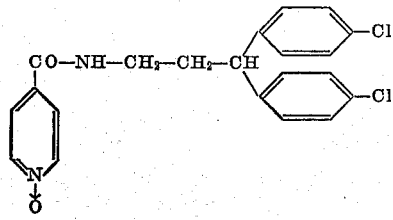
3. The compound of the formula
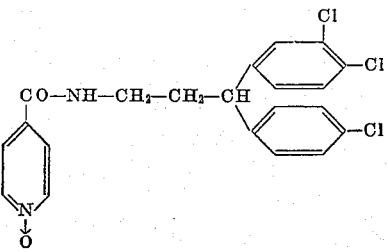
References Cited in the file of this patent
UNITED STATES PATENTS
2,843,594    Leditschke et al. _____ July 15, 1958